United States Patent
Abotabl et al.

(10) Patent No.: US 11,611,984 B2
(45) Date of Patent: Mar. 21, 2023

(54) SYSTEM AND METHOD FOR PRESERVING WIRELESS TRANSMISSIONS

(71) Applicant: Samsung Electronics Co., Ltd., Suwon-si (KR)

(72) Inventors: Ahmed A. Abotabl, San Diego, CA (US); Jung Hyun Bae, San Diego, CA (US); Mohammed Karmoose, San Diego, CA (US)

(73) Assignee: SAMSUNG ELECTRONICS CO., LTD.

( * ) Notice: Subject to any disclaimer, the term of this patent is extended or adjusted under 35 U.S.C. 154(b) by 183 days.

(21) Appl. No.: 16/886,562

(22) Filed: May 28, 2020

(65) Prior Publication Data

US 2021/0022172 A1 Jan. 21, 2021

Related U.S. Application Data

(60) Provisional application No. 62/875,754, filed on Jul. 18, 2019.

(51) Int. Cl.
*H04W 72/14* (2009.01)
*H04W 72/04* (2009.01)
(Continued)

(52) U.S. Cl.
CPC ....... *H04W 72/14* (2013.01); *H04W 72/0413* (2013.01); *H04W 72/0446* (2013.01); *H04W 72/1284* (2013.01); *H04W 74/0833* (2013.01)

(58) Field of Classification Search
CPC ............. H04W 72/14; H04W 72/0413; H04W 72/0446; H04W 72/1284; H04W 72/0833
See application file for complete search history.

(56) References Cited

U.S. PATENT DOCUMENTS

2011/0053626 A1   3/2011   Lim et al.
2014/0040694 A1*  2/2014   Verma ............... H04L 1/1887
                                              714/748
(Continued)

FOREIGN PATENT DOCUMENTS

JP   2019193193 A   10/2019
KR   20100060661 A   6/2010
(Continued)

OTHER PUBLICATIONS

European Extended Search Report for Application No. 20179174.6, dated Feb. 11, 2021.
(Continued)

*Primary Examiner* — Jasper Kwoh
(74) *Attorney, Agent, or Firm* — Renaissance IP Law Group LLP

(57) ABSTRACT

Various aspects include a method for preserving a msg3 transmission. The method may include receiving, by a UE device, from a base station, a CI that overlaps with the msg3 transmission. Responsive to receiving the CI, the msg3 transmission is not canceled. Another method disclosed herein includes continuing an RA procedure. The method may include encoding a first part of the msgB. The method may include encoding a second part of the msgB. The method may include attempting to decode, by the UE device, the first part of the msgB. The method may include attempting to decode, by the UE device, the second part of the msgB. Based on successfully decoding of the first part of the msgB, and unsuccessfully decoding of the second part of the msgB, the method may include continuing the RA procedure.

7 Claims, 11 Drawing Sheets

(51) Int. Cl.
*H04W 72/12* (2009.01)
*H04W 74/08* (2009.01)
*H04W 72/0446* (2023.01)

(56) References Cited

U.S. PATENT DOCUMENTS

| | | | |
|---|---|---|---|
| 2016/0113008 A1 | 4/2016 | Damnjanovic et al. | |
| 2019/0045554 A1* | 2/2019 | Ye | H04L 5/0007 |
| 2019/0327758 A1 | 10/2019 | Östergaard et al. | |
| 2020/0107370 A1* | 4/2020 | Wei | H04L 1/1812 |
| 2020/0196264 A1* | 6/2020 | Shih | H04W 74/0833 |
| 2020/0314908 A1* | 10/2020 | Hwang | H04W 56/0005 |
| 2021/0168783 A1* | 6/2021 | Islam | H04W 72/042 |
| 2022/0038975 A1* | 2/2022 | Da Silva | H04W 36/08 |

FOREIGN PATENT DOCUMENTS

| | | |
|---|---|---|
| KR | 20190098708 A | 8/2019 |
| KR | 20190114871 A | 10/2019 |

OTHER PUBLICATIONS

Vivo: "Fallback Procedure from z-step RACH to 4-step RACH", 3GPP Draft; R2-1905651 Fallback Procedure From 2-Step RACH to 4-Step RACH, 3rd Generation, Partnership Project (3GPP), Mobile Competence Centre; 650, Route Des Lucioles; F-06921 Sophiaantipolis Cede,vol. RAN WG2, No. Reno, USA; May 13, 2019-May 17, 2019 May 13, 2019, (May 13, 2019), XP051729154, Retrieved from the Internet: URL:http://www.3gpp.org/ftp/Meetings%5F3GPP%5FSYNC/RAN2/DOCs/R2%2D1905651%2Ezip [retrieved on May 13, 2019].

European Partial Search Report for Application No. 20179174.6, dated Nov. 13, 2020.

Mediatek Inc: "On uplink inter-UE transmission pnontization and multiplexing", 3GPP Draft; R1-1906569 on Uplink Inter-UE Transmission Prioritization and Multiplexing, 3rd Generation Partnership Project (3GPP), Mobile Competence Centre; 650, Route Des Lucioles; F-06921 Sophia-A, vol. RAN WG1, no. Reno, USA; May 13, 2019-May 17, 2019, May 13, 2019 (May 13, 2019), XP051728020, Retrieved from the Internet: URL: http://www.3gpp.org/ftp/Meetings%5F3GPP%5FSYNC/RAN1/Docs/R1%2D1906569%2Ezip [retrieved on May 13, 2019].

Qualcomm IncOrporated: "Uplink inter-UE Tx Multiplexing and Prioritzation", 3GPP Draft; R1-1907285 Uplink Inter-UE TX Multiplexing and Prioritization, 3rd Generation Partnership Project (3GPP), Mobile Competence Centre ; 650, Route Des Lucioles; F-06921 Sophia-Antipolis Cede, vol. RAN WG1, no. Reno, Nevada, USA; May 13, 2019-May 17, 2019, May 4, 2019 (May 4, 2019), XP051709308, Retrieved from the Internet:URL:http//www.3gpp.org/ftp/tsg%5Fran/WG1%5FRL1/TSGR1%5F97/ Docs/R1%2D1907285%2Ezip, [retrieved on May 4, 2019].

* cited by examiner

SYSTEM AND METHOD FOR PRESERVING WIRELESS TRANSMISSIONS

RELATED APPLICATION DATA

This application claims the benefit of U.S. Provisional Application Ser. No. 62/875,754, filed on Jul. 18, 2019, which is hereby incorporated by reference.

TECHNICAL AREA

The present embodiments relate to wireless network systems, and more particularly, to systems and methods for preserving msg3 physical uplink shared channel (PUSCH) transmissions with respect to uplink cancelation indication (CI), and for continuing a random access (RA) procedure even when one part of the msgB does not pass error correction and detection procedures.

BACKGROUND

During an RA procedure, a user equipment (UE) device first attempts to connect to a base station. The UE device may transmit a preamble over a physical random access channel (PRACH), configured by system information. The UE device then receives a grant for a PUSCH transmission from a network for contention resolution.

A CI is an indication from the network to the UE device to cancel the PUSCH transmission including time and frequency resources that the network has previously allocated for the UE device. The reason behind such a cancelation is to free up some resources for other users that have higher priority information to transmit, e.g., for ultra-reliable and low-latency communication (URLLC).

Any uplink (UL) transmission can be subject to the aforementioned CI. However, always canceling all types of UL transmissions based on the CI can reduce performance of the system.

BRIEF SUMMARY

Various embodiments of the disclosure include a method for preserving a msg3 transmission. The method may include receiving, by a UE device, from a base station, a CI that overlaps with the msg3 transmission. Responsive to receiving the CI, the msg3 transmission is not canceled.

Some embodiments include a method for partial decoding of a msgB transmission. The method may include encoding, by a base station, a first part of the msgB. The method may include encoding, by the base station, a second part of the msgB. The method may include attempting to decode, by the UE device, the first part of the msgB. The method may include attempting to decode, by the UE device, the second part of the msgB. Based on successfully decoding of the first part of the msgB, and unsuccessfully decoding of the second part of the msgB, the method may include continuing the RA procedure.

BRIEF DESCRIPTION OF THE DRAWINGS

The foregoing and additional features and advantages of the present disclosure will become more readily apparent from the following detailed description, made with reference to the accompanying figures, in which.

DETAILED DESCRIPTION

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first interface could be termed a second interface, and, similarly, a second interface could be termed a first interface, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein provide a system and method by which message 3 (msg3) PUSCH transmission during an RA procedure need not be subject to a CI. Accordingly, msg3 PUSCH transmission, which may have an important role during an RA procedure, can reliably be transmitted and received. In addition, for 2-step random access channel (2-step RACH), partial decoding of message B (msgB) can be performed to extract a time advance (TA), random access preamble identifier (RAPID), and/or uplink (UL) grant information prior to other parts of the msgB. Accordingly, a probability of successful 2-step RACH completion can be increased.

A CI is an indication from a network to a UE device to cancel the UE device's transmission including time and frequency resources that the network has previously allocated for the UE device. To perform this cancelation, the UE device may first receive the CI during a monitoring occasion (MO).

Figure 1:
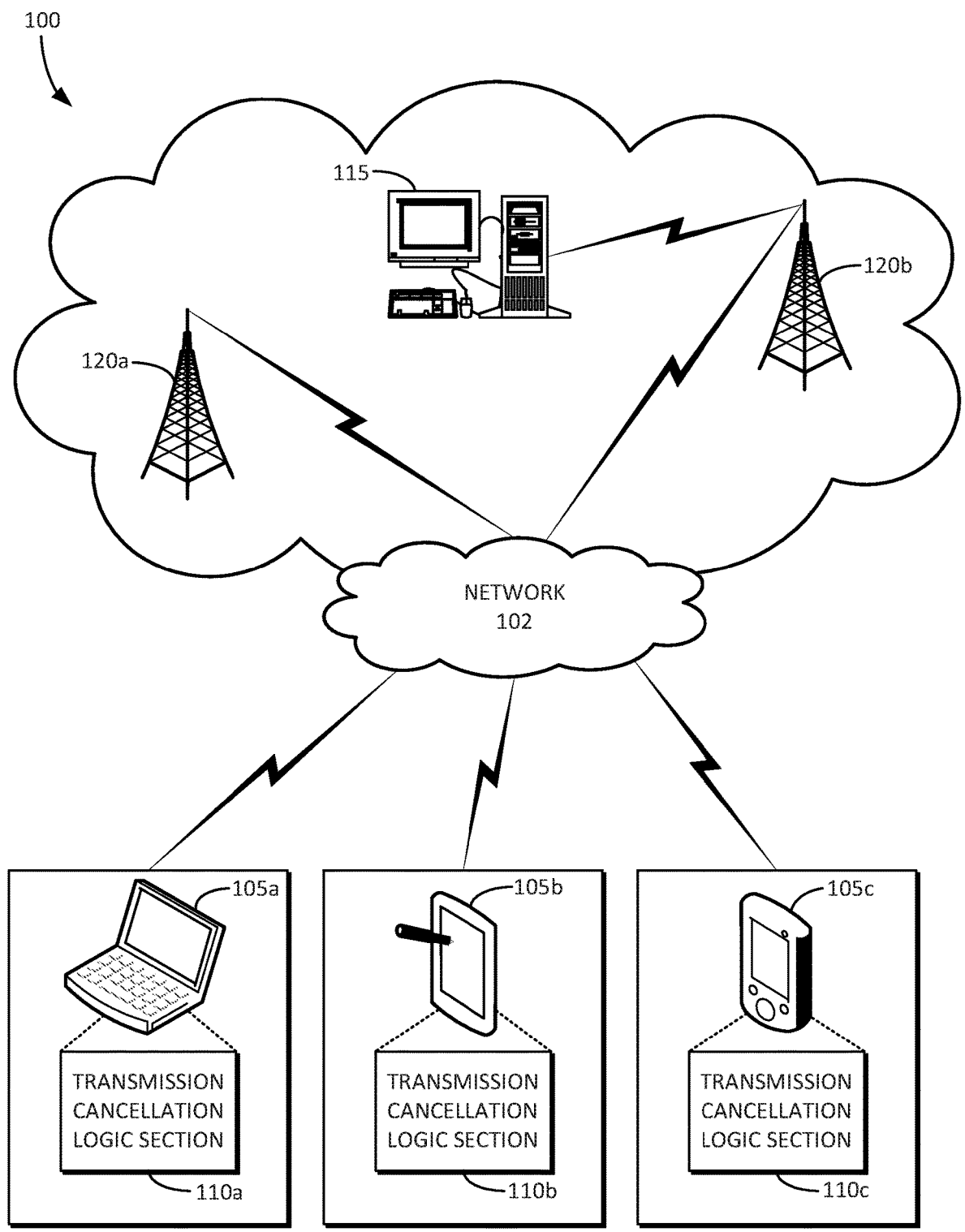
FIG. 1 illustrates a system including a network and one or more UE devices each having a transmission cancelation logic section in accordance with some embodiments disclosed herein.

FIG. 1 illustrates a system 100 including a network 102 and one or more UE devices (e.g., 105a, 105b, 105c) each having a transmission cancelation logic section (e.g., 110a, 110b, 110c) in accordance with some embodiments disclosed herein. The network 102 may include a cellular network or other type of wireless network. The UE devices may include, for example, a mobile computer 105a, a smart tablet 105b, a smart mobile phone 105c, or the like. The one or more UE devices (e.g., 105a, 105b, 105c) may be communicatively coupled to one or more remote base station devices (e.g., 115) via the network 102. The network 102 may include one or more towers such as cell towers 120a and 120b to facilitate transmission of information between the one or more UE devices (e.g., 105a, 105b, 105c) and the network 102. The network 102 may include the one or more remote base station devices 115. The transmission cancelation logic section (e.g., 110a, 110b, 110c) may be embedded within each of the corresponding UE devices (e.g., 105a, 105b, 105c). The transmission cancelation logic section (e.g., 110a, 110b, 110c) may be embodied as software, firmware, hardware, or any suitable combination thereof.

Figure 2:
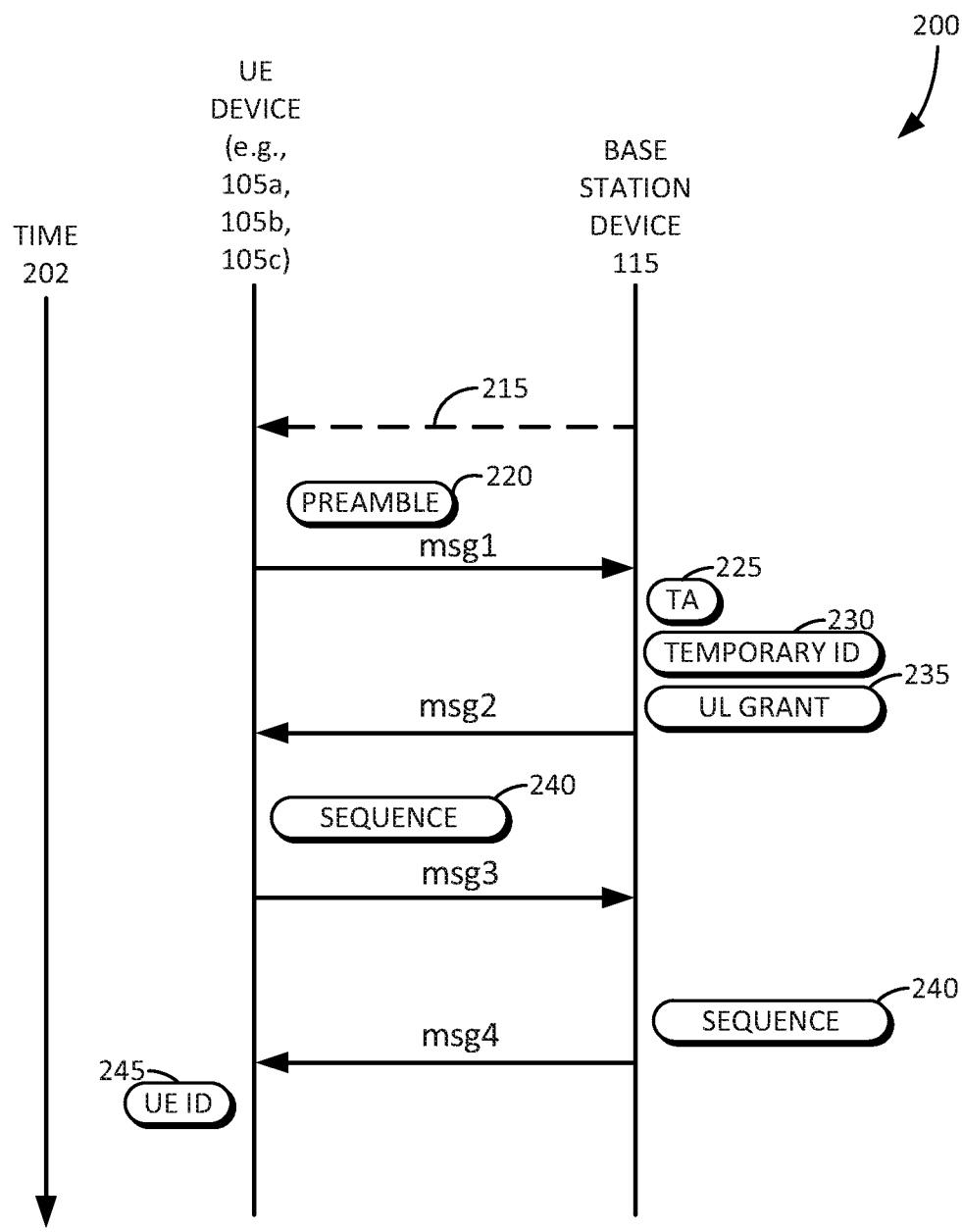
FIG. 2 illustrates messaging in a timing diagram along a time axis including four messaging steps within an RA procedure.

FIG. 2 illustrates messaging in a timing diagram 200 along a time axis 202 including four messaging steps between a UE device (e.g., 105a, 105b, 105c) and a base station device (e.g., 115) within an RA procedure. The base station device 115 may be a gNodeB (gNB) device, for example. An UL CI is an indication from a network (e.g., 102 in FIG. 1) to a UE device (e.g., 105a, 105b, 105c) to cancel the UE device's transmission in time and frequency resources that the network 102 (of FIG. 1) has previously allocated for the UE device. One reason for such a cancelation is to free up some resources for other users that have higher priority information to transmit, e.g., URLLC. Any UL transmission can be subject to a CI. In the system and method disclosed herein, UL transmissions in an RA procedure may be preserved due to their importance, as further described below.

The RA procedure illustrated in FIG. 2 may include four steps, for example. The diagram 200 may include a 4-step RACH. The 4-step RACH may be an RA procedure that is performed in four steps. Before initializing the RA procedure, the UE device (e.g., 105a, 105b, 105c) may receive broadcasted system information 215 from a base station device 115 (e.g., gNB device). The broadcasted system information 215 may include master information block (MIB) and/or system information block (SIB) information, for example. The broadcasted system information 215 may inform the UE device (e.g., 105a, 105b, 105c) about a configuration of the RA procedure.

In a first step, a message 1 (msg1) may be transmitted from the UE device (e.g., 105a, 105b, 105c) to the base station device 115. In the msg1, the UE device may transmit a preamble 220 over a PRACH, based on the broadcasted system information 215. The base station device 115 may use the preamble 220 to calculate or otherwise determine a TA 225, which may be used by the UE device to adjust the UE device's UL timing. In some embodiments, the UE device may use more than one preambles, and the UE device may select one preamble (e.g., 220) from among the more than one preambles.

In a second step, a message 2 (msg2) may be transmitted from the base station device 115 to the UE device (e.g., 105a, 105b, 105c). The msg2 may include the TA 225, which was calculated after the base station device 115 received the msg1. The msg2 may also include a temporary identifier 230 and/or a UL grant 235. The temporary identifier 230 may be a temporary cell radio network temporary identifier (TC-RNTI). The UL grant 235 may be used by the UE device to transmit the msg3. In other words, the msg3 transmitted by the UE device may be based on the UL grant 235.

In a third step, a message 3 (msg3) may be transmitted from the UE device (e.g., 105a, 105b, 105c) to the base station device 115. In some embodiments, the msg3 is transmitted over a PUSCH based on resources allocated by the UL grant 235 received in the msg2. The msg3 may include a contention resolution sequence 240.

In a fourth step, a message 4 (msg4) may be transmitted from the base station device 115 to the UE device (e.g., 105a, 105b, 105c). The msg4 may include the same contention resolution sequence 240 to be confirmed by the UE device. The UE device may confirm the contention resolution sequence 240. Once the UE device receives the msg4, and confirms that the contention resolution sequence 240 is the contention resolution sequence 240 that was transmitted earlier in the msg3, the UE device may consider itself as being in a connected state, and may promote the temporary identifier 230 to a UE identifier 245. The UE identifier 245 may be a cell radio network temporary identifier (C-RNTI).

The illustrated RA procedure may be a first procedure that a UE device (e.g., 105a, 105b, 105c) performs when the UE device attempts to establish an initial connection to the network 102. The initial msg1 has particular importance in the RA procedure, but so does the msg3 because a failure of the msg3 would mean that the RA procedure is not successful. Accordingly, in some embodiments disclosed herein, a cancelation of the msg3 is not permitted even when there is a CI of any form that might otherwise indicate cancelation of the msg3. In other words, the UE device may always transmit the msg3 via the PUSCH regardless of any potential CI overlapping with the msg3 PUSCH allocation. In some embodiments, the transmission cancelation logic section (e.g., 110a, 110b, 110c of FIG. 1) of the UE device (e.g., 105a, 105b, 105c) may cause the transmission of the msg3 via the PUSCH regardless of any potential CI overlapping with the msg3 PUSCH allocation.

Figure 3:
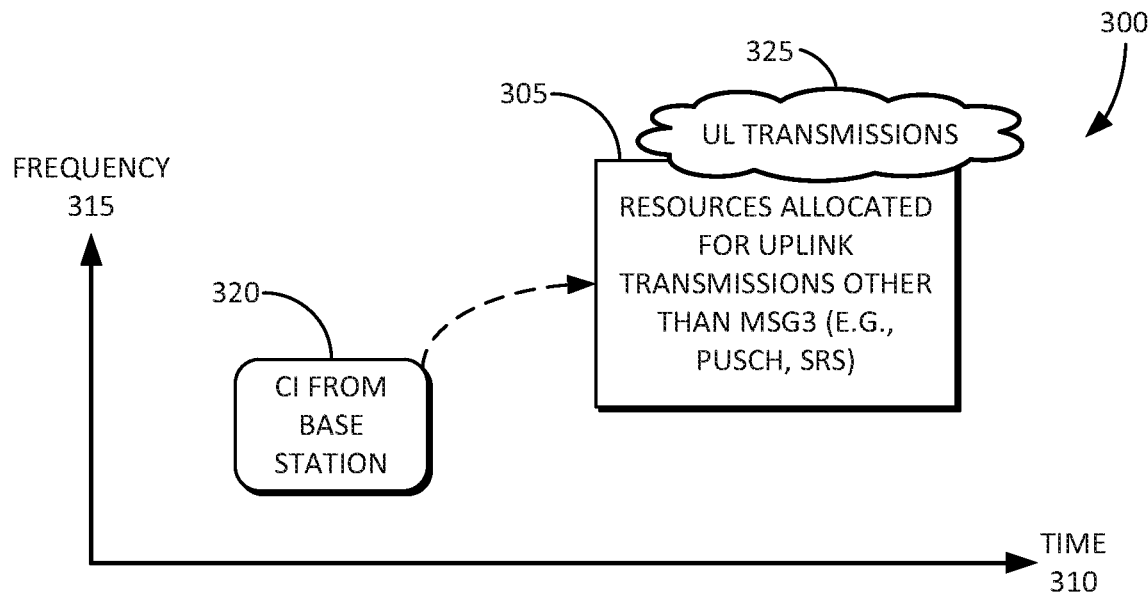
FIG. 3 illustrates a frequency and timing diagram associated with an RA procedure in accordance with some embodiments disclosed herein.
Figure 4:
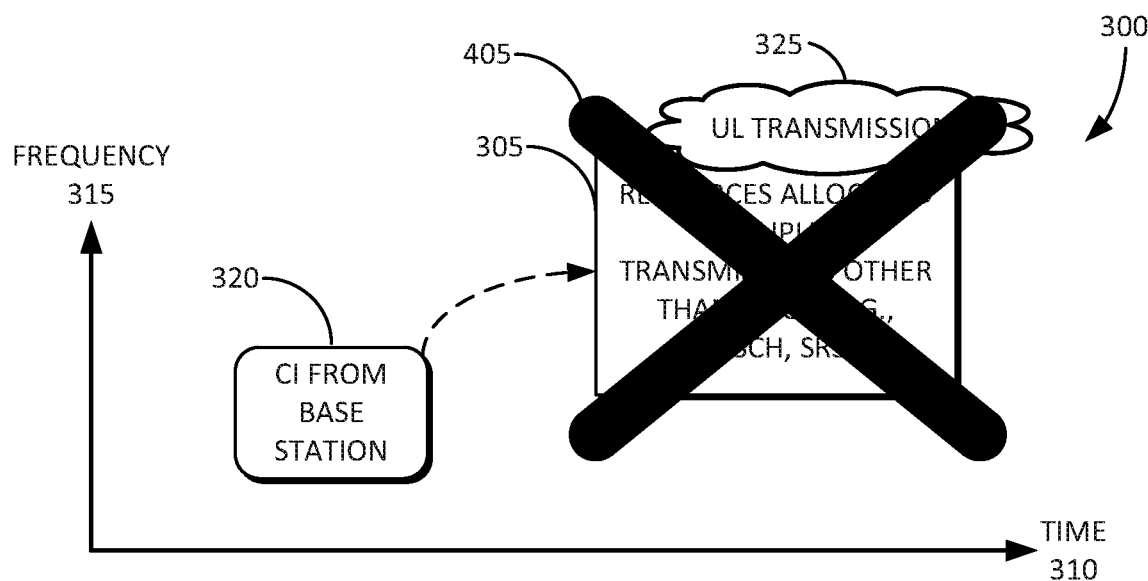
FIG. 4 illustrates the frequency and timing diagram of FIG. 3 associated with the RA procedure including a cancelation in accordance with some embodiments disclosed herein.

FIG. 3 illustrates a frequency and timing diagram 300 associated with an RA procedure in accordance with some embodiments disclosed herein. FIG. 4 illustrates the frequency and timing diagram 300 of FIG. 3 associated with the RA procedure including a cancelation 405 in accordance with some embodiments disclosed herein. Reference is now made to FIGS. 3 and 4.

In some embodiments, the UE device (e.g., 105a, 105b, 105c of FIG. 1) may be assigned resources 305 in time 310 and frequency 315 to use for one or more UL transmissions 325. In FIG. 3, the base station (e.g., 115 of FIG. 1) may send the UE device a command 320, which may indicate to the UE device that the one or more UL transmissions 325 and/or the resources 305 should be canceled. The command 320 may be a CI. The CI 320 may point to some or all of the resources 305. The one or more UL transmissions 325 may be for sending transmissions other than msg3 (e.g., PUSCH and/or sounding reference signal (SRS)). In response, as shown in FIG. 4, the UE device may cancel (e.g., 405) the one or more UL transmissions 325 in some or all of the resources 305 previously allocated for the one or more UL transmissions 325. Put differently, after receiving the CI 320, the UE device may not transmit in some or all of the resources 305. Accordingly, at least some of the resources 305 may be freed up for other UE devices (e.g., 105a, 105b, 105c of FIG. 1) that may have higher priority information to transmit.

Figure 5:
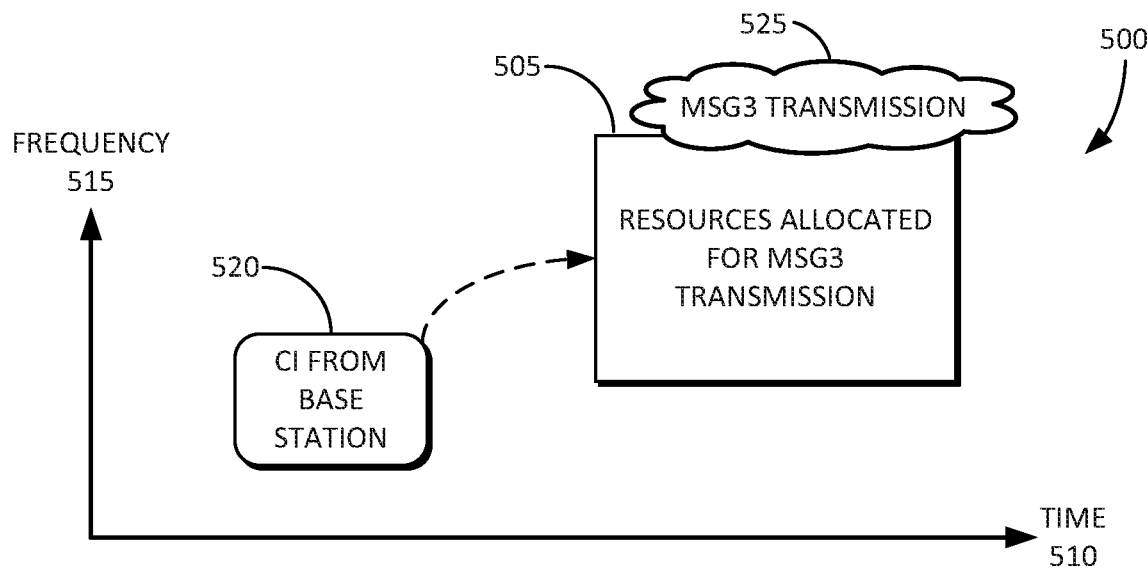
FIG. 5 illustrates a frequency and timing diagram associated with a msg3 transmission in an RA procedure in accordance with some embodiments disclosed herein.
Figure 6:
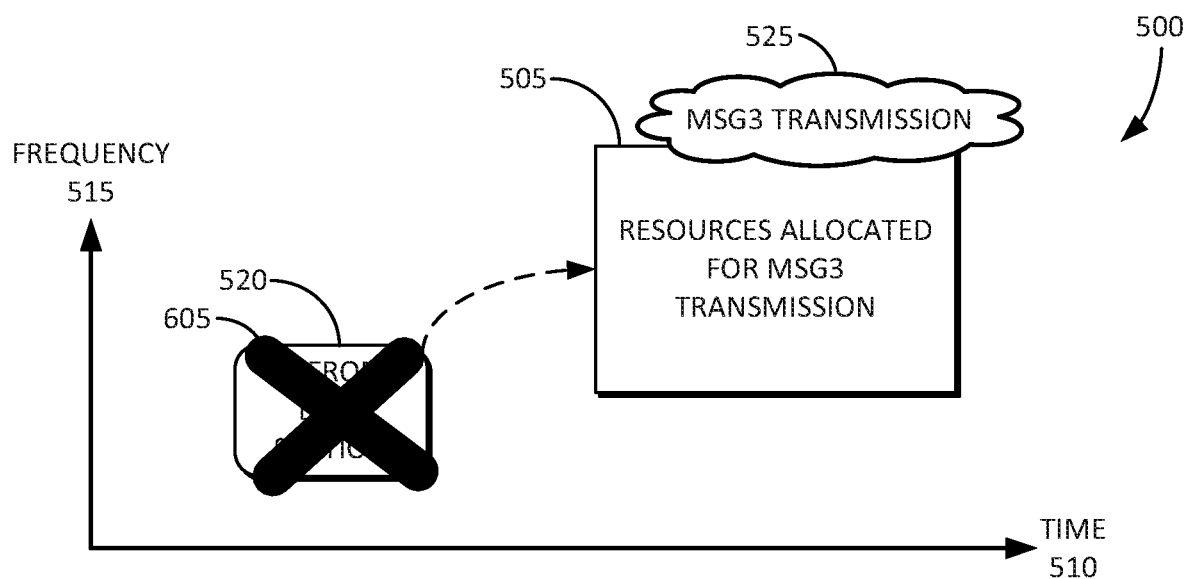
FIG. 6 illustrates the frequency and timing diagram of FIG. 5 associated with the msg3 transmission in the RA procedure including not canceling resources in accordance with some embodiments disclosed herein.

FIG. 5 illustrates a frequency and timing diagram 500 associated with a msg3 transmission 525 in an RA procedure in accordance with some embodiments disclosed herein. FIG. 6 illustrates the frequency and timing diagram 500 of FIG. 5 associated with the msg3 transmission 525 in the RA procedure including not canceling resources 505 in accordance with some embodiments disclosed herein.

The UE device (e.g., 105a, 105b, 105c of FIG. 1) may be assigned resources 505 in time 510 and frequency 515 for transmitting a msg3 transmission 525 in an RA procedure. The resources 505 may have been allocated by a UL grant (e.g., 235 of FIG. 2) received previously by the UE device from the base station (e.g., 115 of FIG. 1). The base station 115 may send the UE device a command 520, which may indicate to the UE device that the msg3 transmission 525 and/or the resources 505 should be canceled. The command 520 may be a CI. According to some embodiments disclosed herein, the UE device may ignore at least a part of the command 520, which indicates that the resources 505 that would otherwise be used for transmitting the msg3 transmission 525 are subject to cancelation. In other words, the UE device may ignore (e.g., 605) the command 520 that indicates a cancelation of the msg3 transmission 525 and/or the associated resources 505. Accordingly, the UE device (e.g., 105a, 105b, 105c of FIG. 1) may continue with transmitting the msg3 transmission 525, and therefore, the msg3 transmission 535 may be preserved despite the CI 520.

When the CI (e.g., 320, 520) indicates a cancelation of resources other than the resources 505 that are used for transmitting the msg3 transmission 525, the UE device (e.g., 105a, 105b, 105c of FIG. 1) may follow the CI (e.g., 320, 520), and may cancel one or more UL transmissions (e.g., 325 of FIG. 3) and/or the associated resources (e.g., 305 of FIG. 3) not used for msg3 transmission. Accordingly, the CI (e.g., 320, 520) may be honored for non-msg3 UL transmissions.

Figure 7:
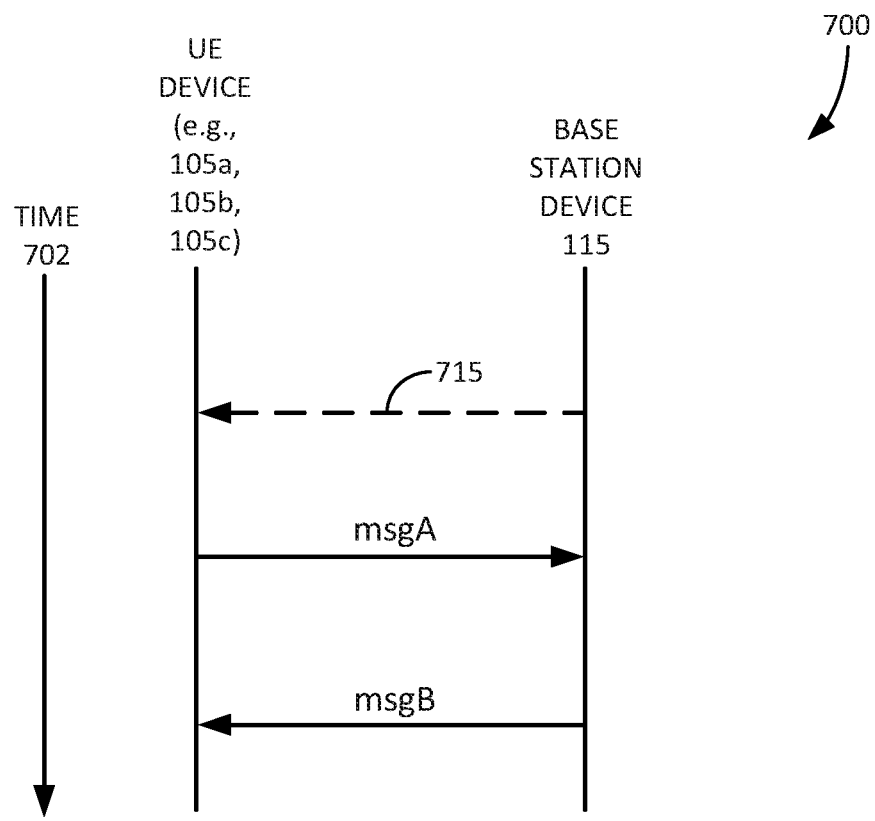
FIG. 7 illustrates messaging in a timing diagram along a time axis including two messaging steps within an RA procedure.

FIG. 7 illustrates messaging in a timing diagram 700 along a time axis 702 including two messaging steps within an RA procedure. The diagram 700 may include partial decoding of a msgB in a 2-step RACH. The 2-step RACH may be an RA procedure that is performed in two steps. Before initializing the RA procedure, the UE device (e.g., 105a, 105b, 105c) may receive broadcasted system information 715 from a base station device 115 (e.g., gNB device). The broadcasted system information 715 may include master information block (MIB) and/or system information block (SIB) information, for example. The broadcasted system information 715 may inform the UE device (e.g., 105a, 105b, 105c) about a configuration of the RA procedure.

In a first step, a message A (msgA) may be transmitted from the UE device (e.g., 105a, 105b, 105c) to the base station device 115. The msgA may be essentially equivalent to a combination of the msg1 and the msg3 as shown in the 4-step RACH of FIG. 2. The msgA may be performed in two separate transmissions, one including the same contents of msg1 and another including the same contents of msg3. In a second step, a message B (msgB) may be transmitted from the base station device 115 to the UE device (e.g., 105a, 105b, 105c). The msgB may be essentially equivalent to a combination of the msg2 and the msg4 as shown in the 4-step RACH of FIG. 2.

Figure 8:
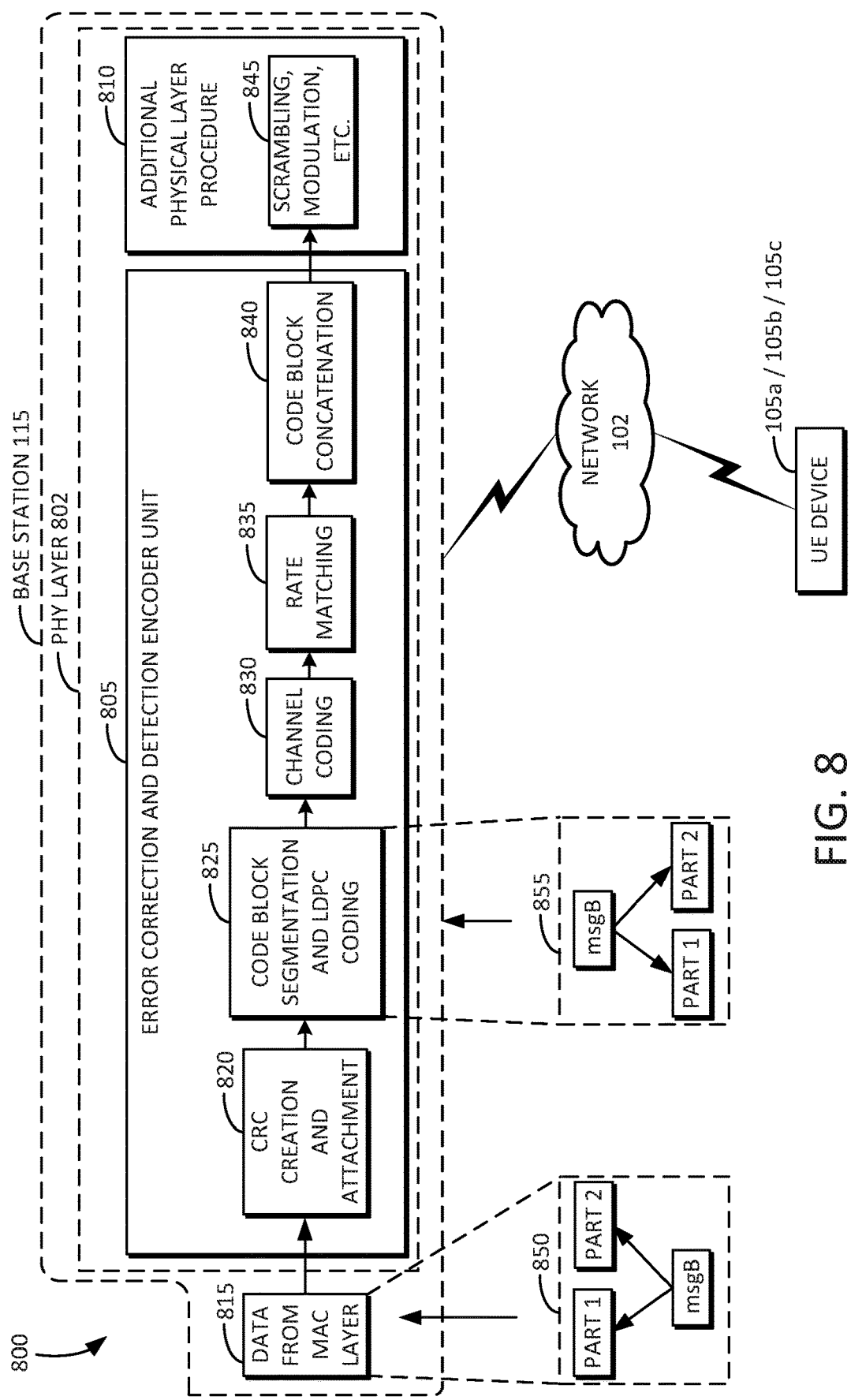
FIG. 8 is a block diagram illustrating a procedure to prepare a physical downlink shared channel (PDSCH) in accordance with some embodiments disclosed herein.

FIG. 8 is a block diagram 800 illustrating a procedure to prepare a physical downlink shared channel (PDSCH) in accordance with some embodiments disclosed herein. A data payload 815 may be provided by a media access control (MAC) layer to a physical (PHY) layer 802 of the base station 115 to be prepared for transmission. The process of preparing the data payload 815 may include error correction and detection encoding by an error correction and detection encoder unit 805. The error correction and detection encoder unit 805 may perform cyclic redundancy check (CRC) creation and attachment 820 and code block segmentation and low-density parity-check (LDPC) encoding 825, for example. Error correction and detection encoding by the base station 115 allows the UE device (e.g., 105a, 105b, 105c of FIG. 1) to correctly receive (or at least detect erroneous) PDSCH that are transmitted through relatively harsh channel conditions. The error correction and detection encoder unit 805 of the base station 115 may perform channel coding 830, rate matching 835, and/or code block concatenation 840. Following the operations performed by the error correction and detection encoder unit 805, additional physical layer procedures 810 may include scrambling, modulation, or the like, as shown at 845.

According to some embodiments disclosed herein, the msgB can be split into two parts (e.g., part 1 and part 2) as shown at 850. The split, for example, can be performed at the data from MAC layer 815. Each of the separate parts (e.g., part 1 and part 2) of the msgB can be fed through the error correction and detection encoder unit 805 for individual processing. In this manner, if one of the parts fails during later decoding by the UE device (e.g., 105a, 105b, 105c of FIG. 1), then the UE device may still be able to successfully decode the other part of the msgB, and succeed in completing the RA procedure, as further described below.

In some embodiments, the split can be performed at the code block segmentation and LDPC coding stage 825 rather than at the data from the MAC layer 815 stage, as shown at 855. Each of the separate parts (e.g., part 1 and part 2) of the msgB can be fed through remaining phases of the error correction and detection encoder unit 805 for individual processing. In this manner, if one of the parts later fails to be decoded by the UE device (e.g., 105a, 105b, 105c of FIG. 1), the UE device may nevertheless still be able to successfully decode the other part, and succeed in completing the RA procedure, as further described below.

The msgB may be split into multiple parts and separately transmitted from the base station 115 to the UE device (e.g., 105a, 105b, 105c of FIG. 1). In some embodiments, each of the individual parts may be independently checked for errors by the UE device. In some embodiments, the msgB is not split into multiple parts, but rather, remains as a single transmission, and instead the UE device may detect errors in different parts of the single transmission.

Figure 9:
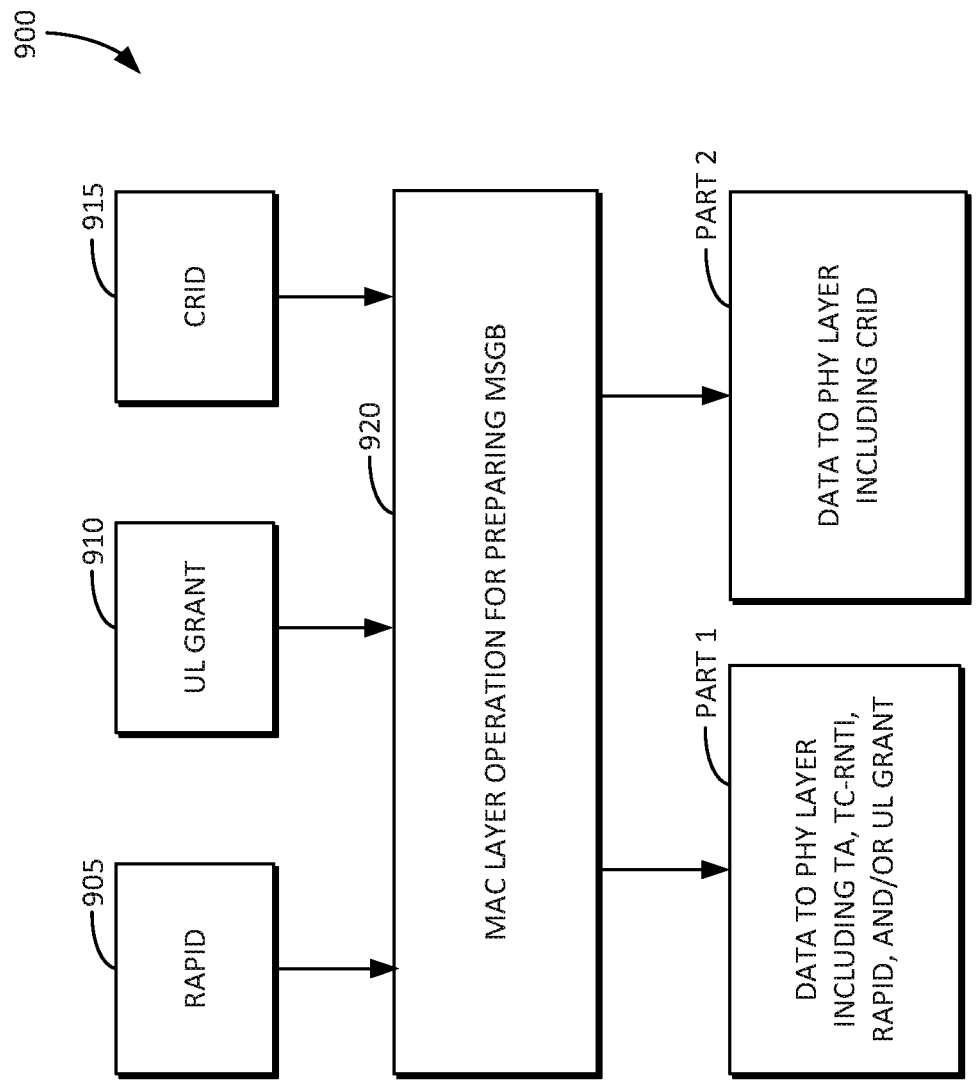
FIG. 9 is an example block diagram illustrating a procedure for splitting the msgB in accordance with some embodiments disclosed herein.

FIG. 9 is an example block diagram 900 illustrating a procedure for splitting the msgB in accordance with some embodiments. The first part (e.g., part 1) of the msgB may be the same as or substantially equivalent to the msg2 from the 4-step RACH disclosed above. Accordingly, the first part (e.g., part 1) may at least include the TA (e.g., 225 of FIG. 2) and the TC-RNTI (e.g., 230 of FIG. 2). The second part (e.g., part 2) may include a contention resolution identifier (CRID) 915.

When the UE device (e.g., 105a, 105b, 105c of FIG. 1) can successfully decode the first part (e.g., part 1), there is not necessarily a way for the UE device to determine that a particular message is intended for the UE device. Moreover, there is not necessarily a way for the UE device to determine whether a collision occurred unless the RAPID 905 is included in the first part (e.g., part 1) of msgB. Accordingly, the RAPID 905 may be included in the first part (e.g., part 1) of msgB.

When the second part (e.g., part 2) of the msgB fails (e.g., is not successfully decoded), the UE device (e.g., 105a, 105b, 105c of FIG. 1) may need to go back to the first step of establishing a connection with the base station (e.g., 115 of FIG. 1) unless the UE device has the UL grant 910 that can be used for the transmission of a contention resolution sequence (e.g., 240 of FIG. 2). Therefore, the first part (e.g., part 1) of the msgB may include the RAPID 905 to identify which UE device the transmission is intended for. Moreover, the first part (e.g., part 1) of the msgB may include the UL grant 910, which allows the UE device to not fall back to the first step in the RA procedure.

In the case of a separate decoding of msgB parts, the RAPID 905 and the UL grant 910 may be transmitted in the first part (e.g., part 1) from the base station (e.g., 115 of FIG. 1) to the UE device (e.g., 105a, 105b, 105c of FIG. 1). The RAPID 905 may be used for identification and the UL grant 910 may be used for the transmission of the msg3 in case the second part (e.g., part 2) of the msgB fails (e.g., is not successfully decoded by the UE device).

The base station (e.g., 115 of FIG. 1) may create the msgB in a way in which the RAPID 905 and the UL grant 910 can be detected separately with respect to the rest of the msgB. In some embodiments, the base station 115 may create the msgB in a way in which the RAPID 905 and the UL grant 910 can be detected first with respect to the rest of the msgB. Specifically, the MAC layer 920 can take as input, among other data, data such as the RAPID 905, the UL grant 910, and the CRID 915. A procedure of the MAC layer 920 may then create a separate set (e.g., part 1 and part 2) of data to be passed to the PHY layer (e.g., 802 of FIG. 8). The first part (e.g., part 1) may include information such as the RAPID 905 and the UL grant 910. The second part (e.g., part 2) may include information such as the CRID 915.

The procedure with which the base station (e.g., 115 of FIG. 1) can achieve such separation in the msgB can be realized at least in the following two ways. According to the first way, the base station 115 can transmit each of the two parts (e.g., part 1 and part 2) of data that are output from the MAC layer 920 as two separate data payloads from the MAC layer 920 to the PHY layer 802 (of FIG. 8), as described above. According to the second method, the base station 115 can transmit the two parts (e.g., part 1 and part 2) of the data that are output from the MAC layer 920 as one data input packet to the PHY layer 802, as described above. In some embodiments, the code block segmentation and LDPC coding stage 825 ensures that the first part (e.g., part 1) of the output of the MAC layer 920 belongs to an individual code block, separate from another individual code block that contains the second part (e.g., part 2) of the output of the MAC layer 920. The second approach may use a different procedure for receiving data at the UE device (e.g., 105a, 105b, 105c of FIG. 1), thus allowing the UE device to use the data of the first part (e.g., part 1) of the MAC layer 920 when it is correctly received even when the data of the second part (e.g., part 2) of the MAC layer 920 is not correctly received.

The UE device (e.g., 105a, 105b, 105c of FIG. 1) may attempt to decode the first part (e.g., part 1) of the msgB data. Upon correctly receiving and decoding the first part, the UE device may have correctly identified the RAPID 905 and the UL grant 910. The UE device may then be ready to continue with the RA procedure since a) the UE device has determined that the UE device is being addressed by that particular msgB because the RAPID 905 matches, and 2) the UE device has correctly determined the UL grant 910, and therefore, the UE device can send a response to the base station 115 (of FIG. 1) using resources and configurations indicated in the UL grant 910.

Figure 10:
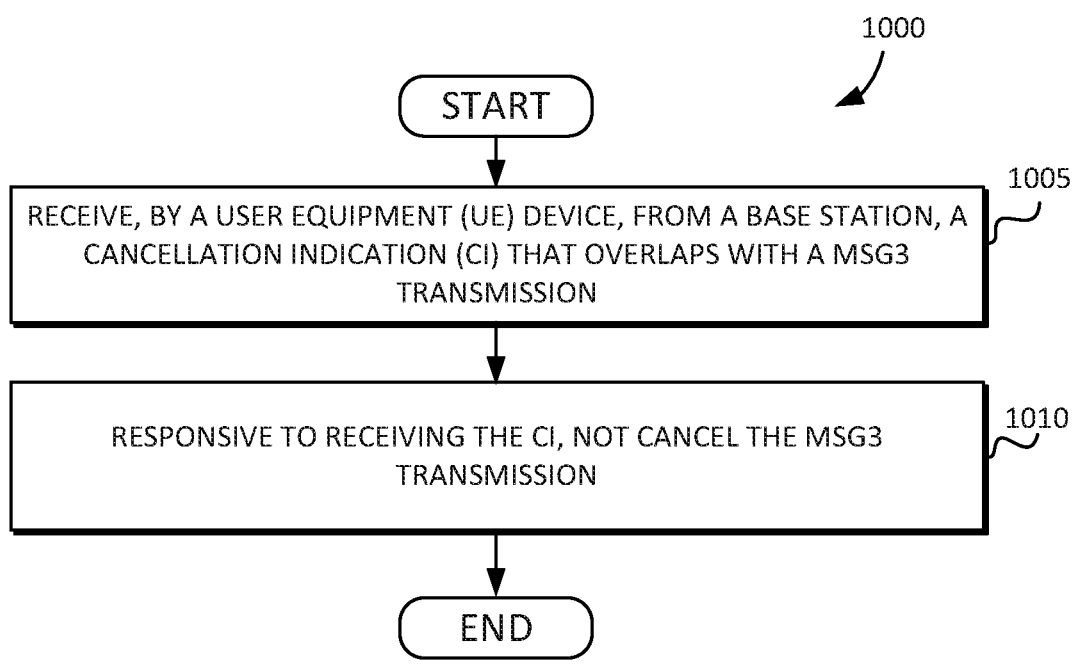
FIG. 10 is a flow diagram illustrating a technique for preserving a msg3 transmission in accordance with some embodiments disclosed herein.

FIG. 10 is a flow diagram 1000 illustrating a technique for preserving a msg3 transmission in accordance with some embodiments disclosed herein. At 1005, a UE device (e.g., 105a, 105b, 105c of FIG. 1) may receive from a base station (e.g., 115 of FIG. 1), a CI that overlaps with a msg3 transmission. At 1010, responsive to receiving the CI, the msg3 transmission is not canceled. In other words, the UE device may determine not to cancel the msg3 transmission.

Figure 11:
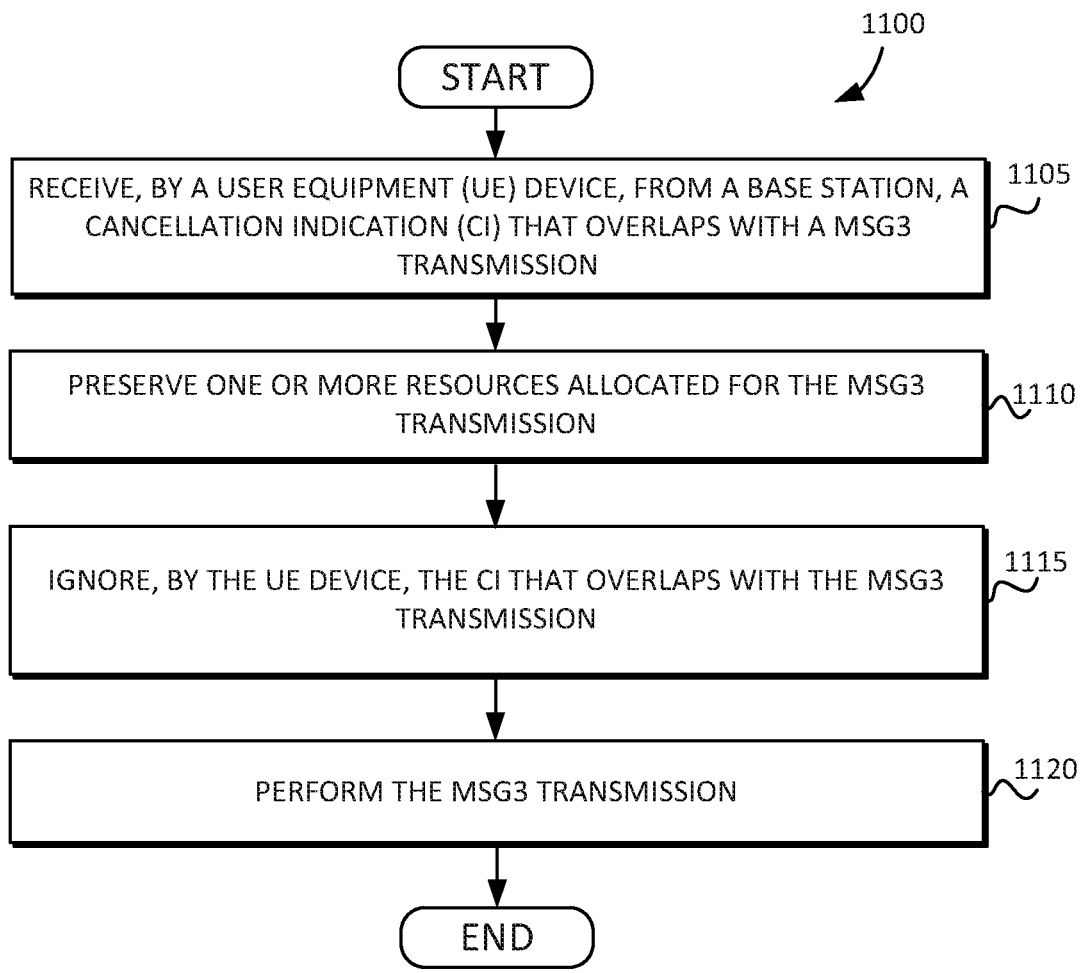
FIG. 11 is a flow diagram illustrating another technique for preserving a msg3 transmission in accordance with some embodiments disclosed herein.

FIG. 11 is a flow diagram 1100 illustrating another technique for preserving a msg3 transmission in accordance with some embodiments disclosed herein. At 1105, the UE device (e.g., 105a, 105b, 105c of FIG. 1) may receive a CI from a base station (e.g., 115 of FIG. 1) that overlaps with a msg3 transmission. At 1110, one or more resources (e.g., 505 of FIG. 5) allocated for the msg3 transmission may be preserved. At 1115, the UE device may ignore the CI that overlaps with the msg3 transmission. At 1120, the UE device may perform the msg3 transmission.

Figure 12:
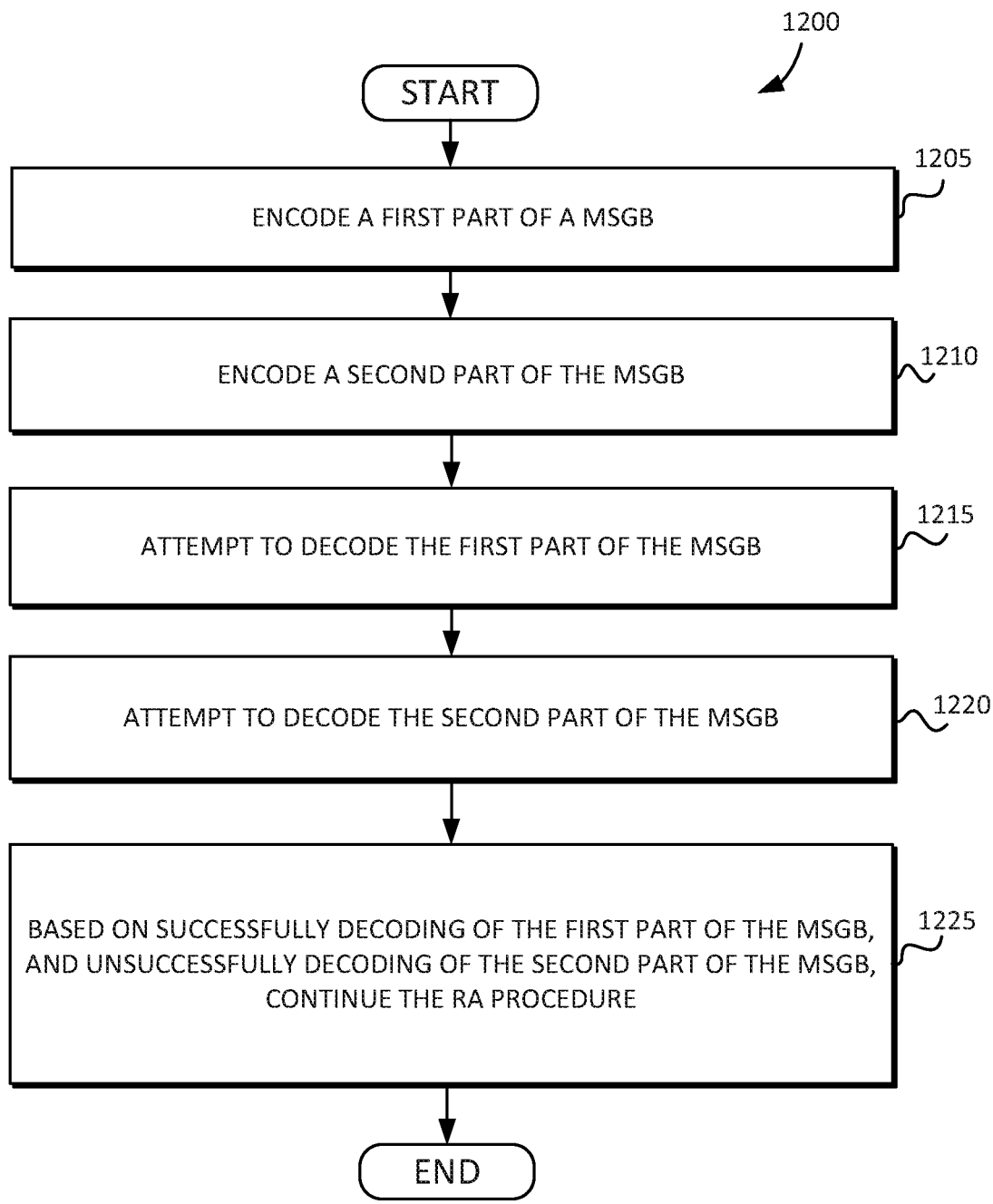
FIG. 12 is a flow diagram illustrating a technique for partial decoding of a msgB transmission in accordance with some embodiments disclosed herein.

FIG. 12 is a flow diagram 1200 illustrating a technique for partial decoding of a msgB transmission in accordance with some embodiments disclosed herein. At 1205, a first part of a msgB may be encoded. At 1210, a second part of the msgB may be encoded. At 1215, the UE device (e.g., 105a, 105b, 105c of FIG. 1) may attempt to decode the first part of the msgB. At 1220, the UE device may attempt to decode the second part of the msgB. At 1225, based on successfully decoding of the first part of the msgB, and unsuccessfully decoding of the second part of the msgB, the base station (e.g., 115 of FIG. 1) and the UE device may continue the RA procedure. For example, the UE device may transmit a msg3 transmission based on the UL grant (e.g., 910 of FIG. 9) in continuation of the RA procedure. The UE device may transmit the msg3 after falling back to a 4-step RACH when decoding of the second part of the msgB is unsuccessful. In other words, the UE device may transmit a UL transmission based on the decoded UL grant in continuation of the RA procedure.

Figure 13:
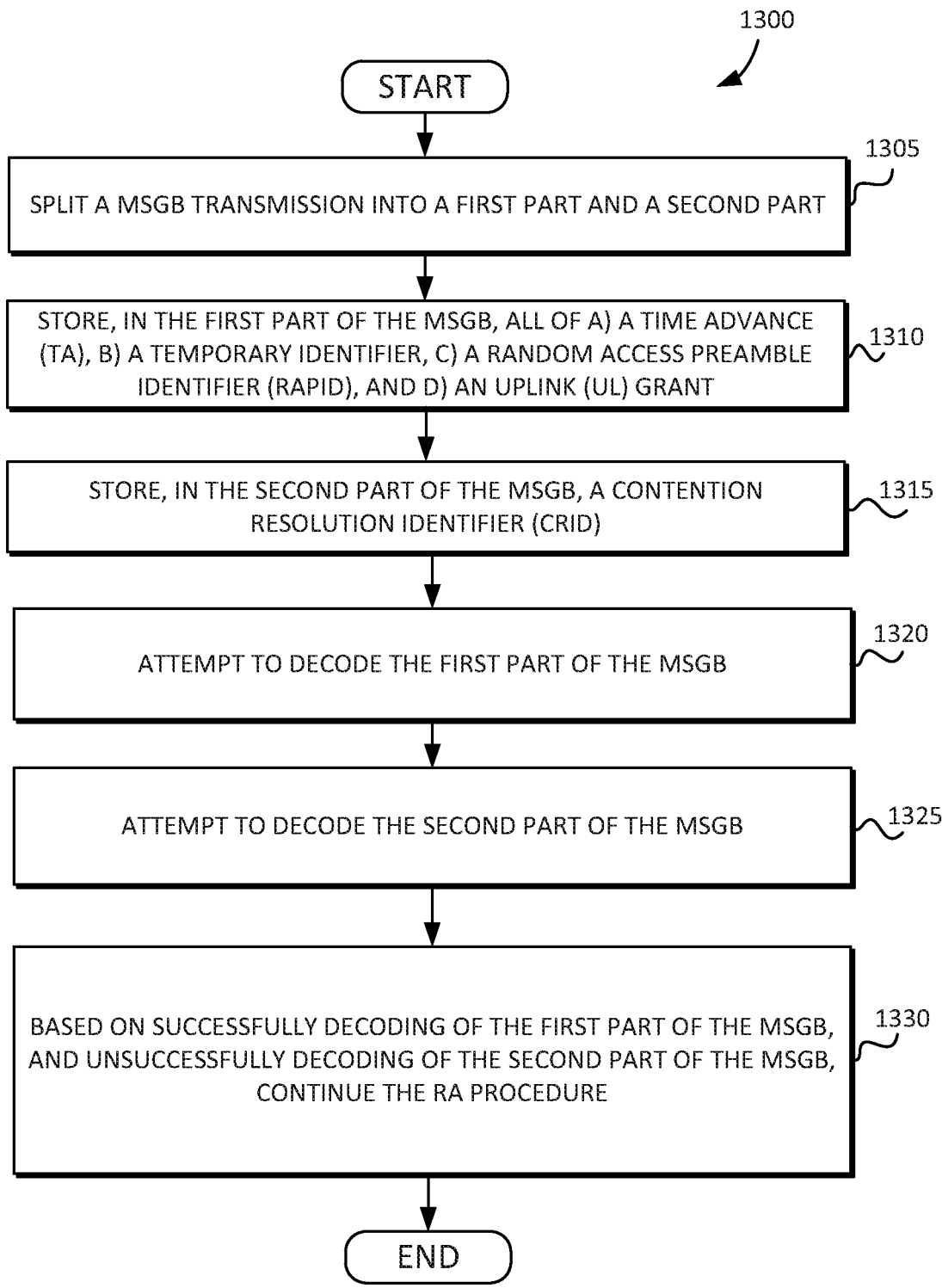
FIG. 13 is a flow diagram illustrating another technique for partial decoding of a msgB transmission in accordance with some embodiments disclosed herein.

FIG. 13 is a flow diagram 1300 illustrating another technique for partial decoding of a msgB transmission in accordance with some embodiments disclosed herein. At 1305, a msgB transmission may be split into a first part and a second part. For example, the base station (e.g., 115 of FIG. 1) may split the msgB transmission into the first part and the second part, and separately encode the first part and the second part. At a later time, the UE device (e.g., 105a, 105b, 105c of FIG. 1) may attempt to decode the two separate parts of the already-split msgB.

At 1310, a TA (e.g., 225 of FIG. 2), a temporary identifier (e.g., 230 of FIG. 2), a RAPID (e.g., 905 of FIG. 9), and a UL grant (e.g., 910 of FIG. 9) may be stored in the first part of the msgB. At 1315, a CRID (e.g., 915 of FIG. 9) may be stored in the second part of the msgB.

At 1320, the UE device (e.g., 105a, 105b, 105c of FIG. 1) may attempt to decode the first part of the msgB. At 1325, the UE device may attempt to decode the second part of the msgB. At 1330, based on successfully decoding of the first part of the msgB, and unsuccessfully decoding of the second part of the msgB, the base station (e.g., 115 of FIG. 1) and the UE device may continue the RA procedure. In other words, the RA procedure may be continued even though the second part of the msgB was unsuccessfully decoded by the UE device.

For example, the UE device may transmit a msg3 transmission based on the UL grant (e.g., 910 of FIG. 9) in continuation of the RA procedure. The UE device may transmit the msg3 after falling back to a 4-step RACH when decoding of the second part is unsuccessful. In other words, the UE device may transmit a UL transmission based on the decoded UL grant in continuation of the RA procedure.

It will be understood that any of the components or any combination of the components described herein can be used to perform one or more of the operations of the flow diagrams of FIGS. 10 through 13. Further, the operations shown in the flow diagrams are example operations, and may involve various additional steps not explicitly covered. The temporal order of the operations may be varied.

The various operations of methods described above may be performed by any suitable means capable of performing the operations, such as various hardware and/or software component(s), circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. A method for preserving a msg3 physical uplink shared channel (PUSCH) transmission, the method comprising:
   receiving, by a user equipment (UE) device, from a base station, a cancelation indication (CI) that overlaps with the msg3 PUSCH transmission;
   responsive to receiving the CI, determining not to cancel the msg3 PUSCH transmission, wherein the CI indicates one or more resources allocated for the msg3 PUSCH transmission; and
   preserving the one or more resources allocated for the msg3 PUSCH transmission responsive to the CI.

2. The method of claim 1, further comprising ignoring, by the UE device, at least part of a command associated with the CI that overlaps with the msg3 PUSCH transmission.

3. The method of claim 1, wherein the CI is a first CI, the method further comprising:
   receiving, by the UE device, from the base station, a second CI that overlaps with a non-msg3 PUSCH transmission; and
   responsive to receiving the second CI, canceling the non-msg3 PUSCH transmission.

4. The method of claim 3, wherein the second CI indicates one or more resources allocated for the non-msg3 PUSCH transmission.

5. The method of claim 4, further comprising canceling the one or more resources allocated for the non-msg3 PUSCH transmission responsive to the second CI.

6. A method for preserving a msg3 physical uplink shared channel (PUSCH) transmission, the method comprising:
   receiving, by a user equipment (UE) device, from a base station, a cancelation indication (CI) that overlaps with the msg3 PUSCH transmission;
   responsive to receiving the CI, determining not to cancel the msg3 PUSCH transmission;
   receiving, by the UE device, from the base station, an uplink (UL) grant;
   allocating the one or more resources for the msg3 PUSCH transmission based on the UL grant; and
   preserving the one or more resources for the msg3 PUSCH transmission after receiving the CI that overlaps with the msg3 PUSCH transmission.

7. The method of claim 6, further comprising performing, by the UE device, the msg3 PUSCH transmission after receiving the CI that overlaps with the msg3 PUSCH transmission.

* * * * *